US011025304B2

(12) United States Patent
Du et al.

(10) Patent No.: US 11,025,304 B2
(45) Date of Patent: Jun. 1, 2021

(54) WIRELESS POWER TRANSMISSION SYSTEM AND DATA TRANSMISSION METHOD

(71) Applicant: DELTA ELECTRONICS, INC., Taoyuan (TW)

(72) Inventors: Shuailin Du, Taoyuan (TW); Jian Zhou, Taoyuan (TW); Yongkai Liao, Taoyuan (TW); Xuecong Xu, Taoyuan (TW); Kaining Tan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 154 days.

(21) Appl. No.: 16/367,286

(22) Filed: Mar. 28, 2019

(65) Prior Publication Data

US 2019/0319674 A1 Oct. 17, 2019

(30) Foreign Application Priority Data

Apr. 11, 2018 (CN) .......................... 201810321446.2

(51) Int. Cl.
*H02J 50/80* (2016.01)
*H04B 5/00* (2006.01)
*H02J 50/12* (2016.01)

(52) U.S. Cl.
CPC ............ *H04B 5/0037* (2013.01); *H02J 50/12* (2016.02); *H02J 50/80* (2016.02)

(58) Field of Classification Search
CPC .......... H04B 5/0037; H02J 50/80; H02J 50/12
USPC ...................................................... 455/41.1
See application file for complete search history.

(56) References Cited

U.S. PATENT DOCUMENTS

| 6,900,016 | B1 * | 5/2005 | Venter | C07H 21/04 435/320.1 |
| 8,390,249 | B2 * | 3/2013 | Walley | H01M 10/44 320/108 |
| 8,957,633 | B2 * | 2/2015 | Yoon | H02J 50/90 320/108 |
| 9,054,746 | B2 * | 6/2015 | Miyabayashi | H02J 50/80 |
| 9,196,964 | B2 * | 11/2015 | Baringer | H01Q 9/0407 |
| 9,444,509 | B2 * | 9/2016 | Hinck | G06F 1/3203 |

(Continued)

FOREIGN PATENT DOCUMENTS

| CN | 104283293 A | 1/2015 |
| JP | 2006201959 A | 8/2006 |
| JP | 2013219845 A | 10/2013 |

*Primary Examiner* — Hai V Nguyen
(74) *Attorney, Agent, or Firm* — CKC & Partners Co., LLC

(57) ABSTRACT

The present disclosure provides a wireless power transmission system and a data transmission method, where the system includes: a first processing module configuring a first communication module according to a block of first preset configuration information, output a first digital signal according to the block of first preset configuration information, and input the first digital signal to the driving module and a second processing module detecting a power signal of the second circuit, obtaining a block of second preset configuration information according to the power signal, and configuring the second communication module according to the block of second preset configuration information. The wireless power transmission system and the data transmission method provided in the present disclosure reduce structural complexity of the device in the case that one-to-one communications is realized.

26 Claims, 9 Drawing Sheets

(56) References Cited

U.S. PATENT DOCUMENTS

| | | | | |
|---|---|---|---|---|
| 9,520,638 B2* | 12/2016 | Baringer | | H01Q 1/48 |
| 9,570,928 B2* | 2/2017 | Ou | | G06F 1/266 |
| 9,601,930 B2* | 3/2017 | Walley | | H02J 50/90 |
| 9,698,874 B2* | 7/2017 | Miyabayashi | | H02J 50/90 |
| 9,899,880 B2* | 2/2018 | Zhang | | H02J 7/025 |
| 9,939,828 B2* | 4/2018 | Moon | | H02M 3/156 |
| 9,991,721 B2* | 6/2018 | Jin | | H01F 5/00 |
| 10,069,324 B2* | 9/2018 | Fine | | H02J 50/40 |
| 10,084,343 B2* | 9/2018 | Fine | | H02J 50/12 |
| 10,110,280 B2* | 10/2018 | Nakano | | H04W 4/80 |
| 10,148,304 B2* | 12/2018 | Chang | | H04W 52/367 |
| 10,312,740 B2* | 6/2019 | Kim | | H02J 50/12 |
| 10,312,746 B2* | 6/2019 | Chu | | H02J 7/025 |
| 10,320,228 B2* | 6/2019 | Fine | | H02J 50/12 |
| 10,340,738 B2* | 7/2019 | Joye | | H04B 5/0037 |
| 10,348,137 B2* | 7/2019 | Tsukamoto | | H04B 5/0031 |
| 10,470,279 B1* | 11/2019 | Fultz | | H05B 47/18 |
| 10,826,316 B2* | 11/2020 | Lin | | H02J 7/025 |
| 2012/0212071 A1* | 8/2012 | Miyabayashi | | H02J 50/12 |
| | | | | 307/104 |
| 2012/0212072 A1* | 8/2012 | Miyabayashi | | H02J 50/40 |
| | | | | 307/104 |
| 2013/0058379 A1* | 3/2013 | Kim | | B60L 53/126 |
| | | | | 375/146 |
| 2013/0229066 A1* | 9/2013 | Karaoguz | | G06K 19/0723 |
| | | | | 307/104 |
| 2014/0347008 A1* | 11/2014 | Chae | | H02J 7/00711 |
| | | | | 320/108 |
| 2015/0118962 A1* | 4/2015 | Chu | | H04B 5/0037 |
| | | | | 455/41.1 |
| 2015/0200716 A1* | 7/2015 | Miyabayashi | | H02J 50/05 |
| | | | | 307/104 |
| 2016/0006356 A1* | 1/2016 | Nirantare | | H02J 50/90 |
| | | | | 363/21.02 |
| 2016/0065005 A1* | 3/2016 | Won | | H02J 50/10 |
| | | | | 307/104 |
| 2016/0150357 A1* | 5/2016 | Jung | | H04W 4/80 |
| | | | | 455/41.1 |
| 2016/0242104 A1* | 8/2016 | Wei | | H04W 48/16 |
| 2017/0104370 A1* | 4/2017 | Watanabe | | H02J 50/60 |
| 2017/0127224 A1* | 5/2017 | Nakano | | H04W 4/80 |
| 2017/0149286 A1* | 5/2017 | Joye | | H02J 7/045 |
| 2017/0324279 A1* | 11/2017 | Kang | | H02J 7/025 |
| 2017/0353054 A1* | 12/2017 | Lee | | H05B 6/1236 |
| 2018/0006508 A1* | 1/2018 | Ueki | | B25J 19/0045 |
| 2018/0152056 A1* | 5/2018 | Takahashi | | B25J 9/12 |
| 2018/0254670 A1* | 9/2018 | Tsukamoto | | H02J 50/80 |
| 2018/0294681 A1* | 10/2018 | Bae | | H02J 50/90 |
| 2018/0316379 A1* | 11/2018 | Chang | | H04B 1/401 |
| 2019/0123593 A1* | 4/2019 | Takahashi | | H02J 50/80 |
| 2019/0213016 A1* | 7/2019 | Raghunath | | G06F 9/4411 |
| 2020/0021136 A1* | 1/2020 | Suga | | H05B 6/062 |

\* cited by examiner

WIRELESS POWER TRANSMISSION SYSTEM AND DATA TRANSMISSION METHOD

CROSS-REFERENCE TO RELATED APPLICATION

This application claims priority to Chinese Patent Application No. 201810321446.2, filed on Apr. 11, 2018, entitled "WIRELESS POWER TRANSMISSION SYSTEM AND DATA TRANSMISSION METHOD", which is incorporated herein by reference in its entirety.

TECHNICAL FIELD

The present disclosure relates to the field of communication technologies and, in particular, to a wireless power transmission system and a data transmission method.

BACKGROUND

In a wireless power transmission system, for controlling power transmission from a transmitter side to a receiver side, the transmitter side and the receiver side need to mutually transmit control signals and protection signals, etc. Due to the spatial separation of the transmitter side and the receiver side, wireless communications is needed to complete the transmission of the signals. However, during the transmission process of wireless signals, the pair that the transmitter side transmits wireless communication signal to the receiver side must be the pair that transmits the power, that is, the wireless communication is one-to-one between the transmitter side and the receiver side, otherwise there will be disorder of the transmitted information between different pairs that transmit power, which makes the wireless power transmission system out of operation.

For realizing one-to-one communications, in the prior art, near field communication (NFC) circuits, which are additionally added at both the transmitter side and the receiver side, are used to transmit information such as an address code related to the communication module when the transmitter side and the receiver side are close to each other. Alternatively, integrated circuits (IC) can be additionally added at both the transmitter side and the receiver side, and when the transmitter side and the receiver side are close to each other, the information of one of the parties may be read by the other via an IC chip so that the transmitter side and the receiver side may automatically perform the one-to-one communications.

However, both of the above methods require addition of additional components (NFC circuits or ICs) placed at both the transmitter side and the receiver side for one-to-one communications between the transmitter side and the receiver side, and there is also a requirement for location of the NFC circuits and the ICs, thereby causing higher structural complexity for the transmitter side and the receiver side.

SUMMARY

The present disclosure provides a wireless power transmission system and a data transmission method, which reduce structural complexity of the device in the case that one-to-one communications is realized.

An embodiment of the present disclosure provides a wireless power transmission system, including:

a wireless power transmission circuit including a first circuit and a second circuit, where the first circuit includes at least one switch;

a first control unit including a first communication module, a first processing module, and a driving module, where:

the first processing module is configured to: configure the first communication module according to a block of first preset configuration information, output a first digital signal according to the block of first preset configuration information;

the driving module is configured to generate a second driving signal according to the first digital signal and a first driving signal; and the first circuit controls ON and OFF of the at least one switch according to the second driving signal; and a second control unit including a second communication module and a second processing module, where the second processing module is configured to: detect a power signal of the second circuit, obtain a block of second preset configuration information according to the power signal, and configure the second communication module according to the block of second preset configuration information, wherein the block of first preset configuration information is corresponding to the block of second preset configuration information.

Another embodiment of the present disclosure provides a data transmission method applied in a wireless power transmission system, the wireless power transmission system and the data transmission method in these embodiments can make the block of preset configuration information of the second communication module the same as or corresponding to that of the first communication module without using an additional external device, so that one-to-one communications may be realized within corresponding channels for the transmitter side and the receiver side of wireless communication modules, the cost is reduced, and complexity of the device is reduced.

BRIEF DESCRIPTION OF DRAWINGS

The accompanying drawings herein are incorporated in and constitute a part of this specification to describe embodiments consistent with the present disclosure, which are used together with the specification to explain principles of the disclosure.

Figure 1:
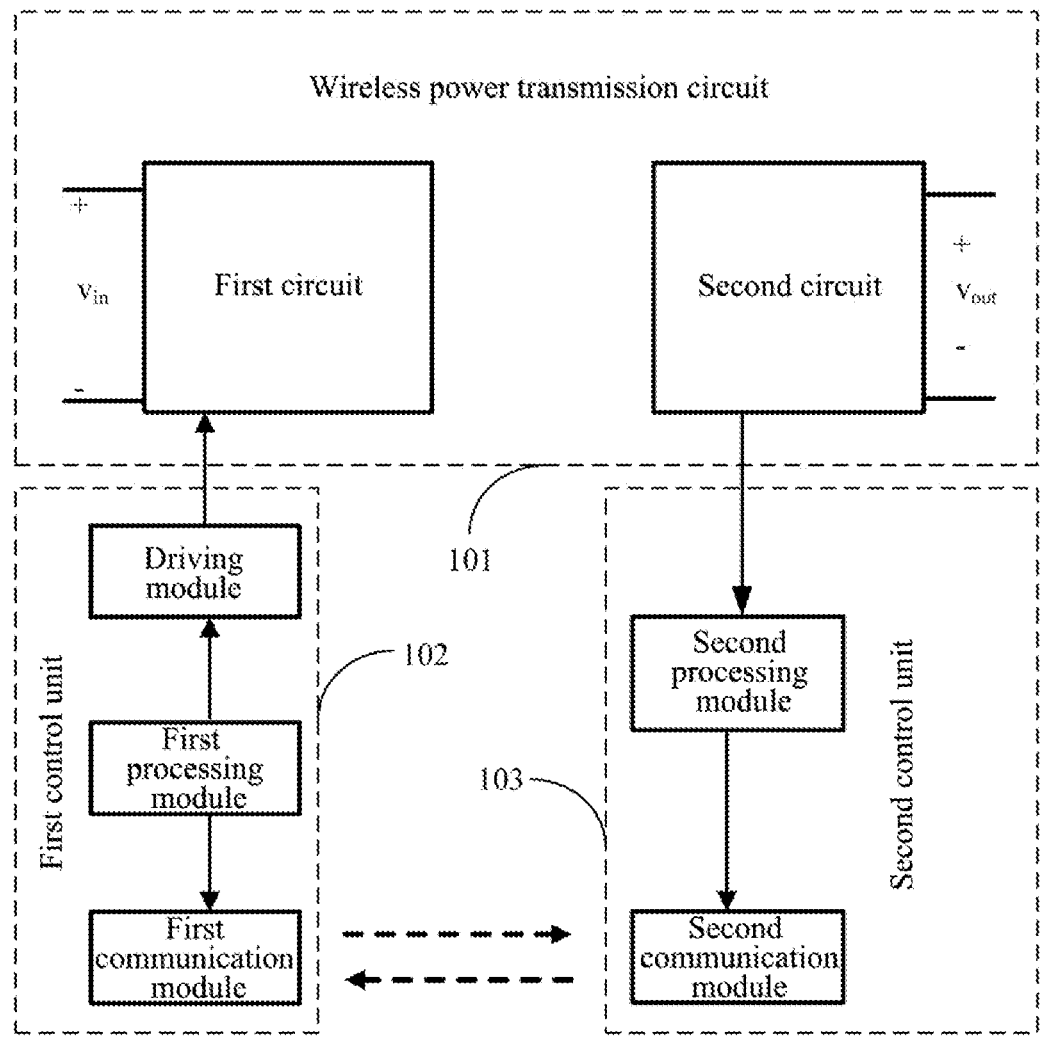
FIG. 1 is a block diagram of a wireless power transmission system according to an embodiment of the present disclosure.

Through the above-described drawings, specific embodiments of the present disclosure have been shown, which will be described in detail hereinafter. These figures and text descriptions are not intended to limit the scope of the present disclosure in any way, but to explain concepts of the present disclosure to those skilled in the art by referring to specific embodiments.

DESCRIPTION OF EMBODIMENTS

Exemplary embodiments will be described in detail herein, examples of which are illustrated in the accompanying drawings. When the following description involves the accompanying drawings, like numerals in different drawings represent the same or similar elements, unless otherwise indicated. Implementations described in the following exemplary embodiments do not represent all embodiments consistent with the present disclosure. Instead, they are merely examples of the device and methods consistent with some aspects of the disclosure as defined in the appended claims.

The terms such as "first", "second", "third", "fourth", etc. (if present) in the specification and the claims as well as the described accompany drawings of the present disclosure are used to distinguish similar objects, but not intended to describe a specific order or sequence. It will be appreciated that the data used in this way may be interchangeable under appropriate circumstances, such that the embodiments of the present disclosure described herein can be implemented in an order other than those illustrated or described herein. Moreover, terms such as "include" and "have" and any variation thereof are intended to cover a non-exclusive inclusion, e.g., processes, methods, systems, products or the device that encompass a series of steps or units are not necessarily limited to those steps or units that are clearly listed, but may include other steps or units that are not explicitly listed or inherent to these processes, methods, products or the device.

In order to build an one-to-one communications automatically between a transmitter side and a receiver side, an embodiment of the present disclosure provides a wireless power transmission system, which includes: a wireless power transmission circuit, a first control unit, and a second control unit, where the first control unit generates a block of preset configuration information, and transmits the block of preset configuration information to the second control unit by way of a power signal via the wireless power transmission circuit, so that the second control unit obtains a block of preset configuration information according to the power signal at the receiver side, and then configures a second communication module according to the block of preset configuration information to make the block of preset configuration information of the second communication module to be corresponding to that of a first communication module, thereby realizing the one-to-one communications between the transmitter side and the receiver side according to the blocks of preset configuration information, and reducing the complexity of the device.

A detailed description will be made hereinafter as to how the technical solutions of the present disclosure and the technical solutions of the present application solve the above technical problems. The following specific embodiments may be combined with each other, and for the same or similar concepts or processes, repetitions will be omitted in some embodiments. The embodiments of the present disclosure will be described hereinafter with reference to the accompanying drawings.

FIG. 1 is a block diagram of a wireless power transmission system 10 according to an embodiment of the present disclosure. As shown in FIG. 1, the wireless power transmission system 10 may include:

a wireless power transmission circuit 101, a first control unit 102, and a second control unit 103, where the wireless power transmission circuit 101 includes a first circuit and a second circuit, and the first circuit includes at least one switch.

The first control unit 102 includes a first communication module, a first processing module, and a driving module, where the first processing module is configured to: configure the first communication module according to a block of first preset configuration information, output a first digital signal according to the block of first preset configuration information, and input the first digital signal to the driving module;

the driving module is configured to generate a second driving signal according to the first digital signal and a first driving signal, and input the second driving signal to the first circuit;

the first circuit controls ON and OFF of the at least one switch according to the second driving signal;

the second control unit 103 includes a second communication module and a second processing module, where the second processing module is configured to: detect a power signal of the second circuit, obtain a block of second preset configuration information according to the power signal of the second circuit, and configure the second communication module according to the block of second preset configuration information to make the block of preset configuration information of the second communication module be corresponding to that of the first communication module.

In an embodiment, the first circuit may be a transmitting circuit of the wireless power transmission circuit 101, the second circuit may be a receiving circuit of the wireless power transmission circuit 101, and the first circuit may wirelessly transmit power to the second circuit. In another embodiment, the first circuit may be a receiving circuit of the wireless power transmission circuit 101, the second circuit may be a transmitting circuit of the wireless power transmission circuit 101, and the second circuit may wirelessly transmit power to the first circuit.

In an embodiment, an inverter circuit in the first circuit may be a half-bridge inverter circuit or a full-bridge inverter circuit. Further, the first circuit may further include a first transformer and a first compensation circuit. The first transformer is connected with the inverter circuit and the first compensation circuit respectively, and the first compensation circuit is further connected with a transmitting coil. The first compensation circuit is configured to compensate for reactive power of the transmitting coil, and the first transformer is configured to achieve a voltage conversion.

In an embodiment, a rectifier circuit in the second circuit may be a full-wave rectifier circuit or a full-bridge rectifier circuit. Further, the second circuit may further include a second compensation circuit and a second transformer. The second compensation circuit is connected with a receiving coil and the second transformer respectively, the second transformer is further connected with the rectifier circuit, the second compensation circuit is configured to compensate for reactive power of the receiving coil, and the second transformer is configured to achieve a voltage conversion.

Figure 2:
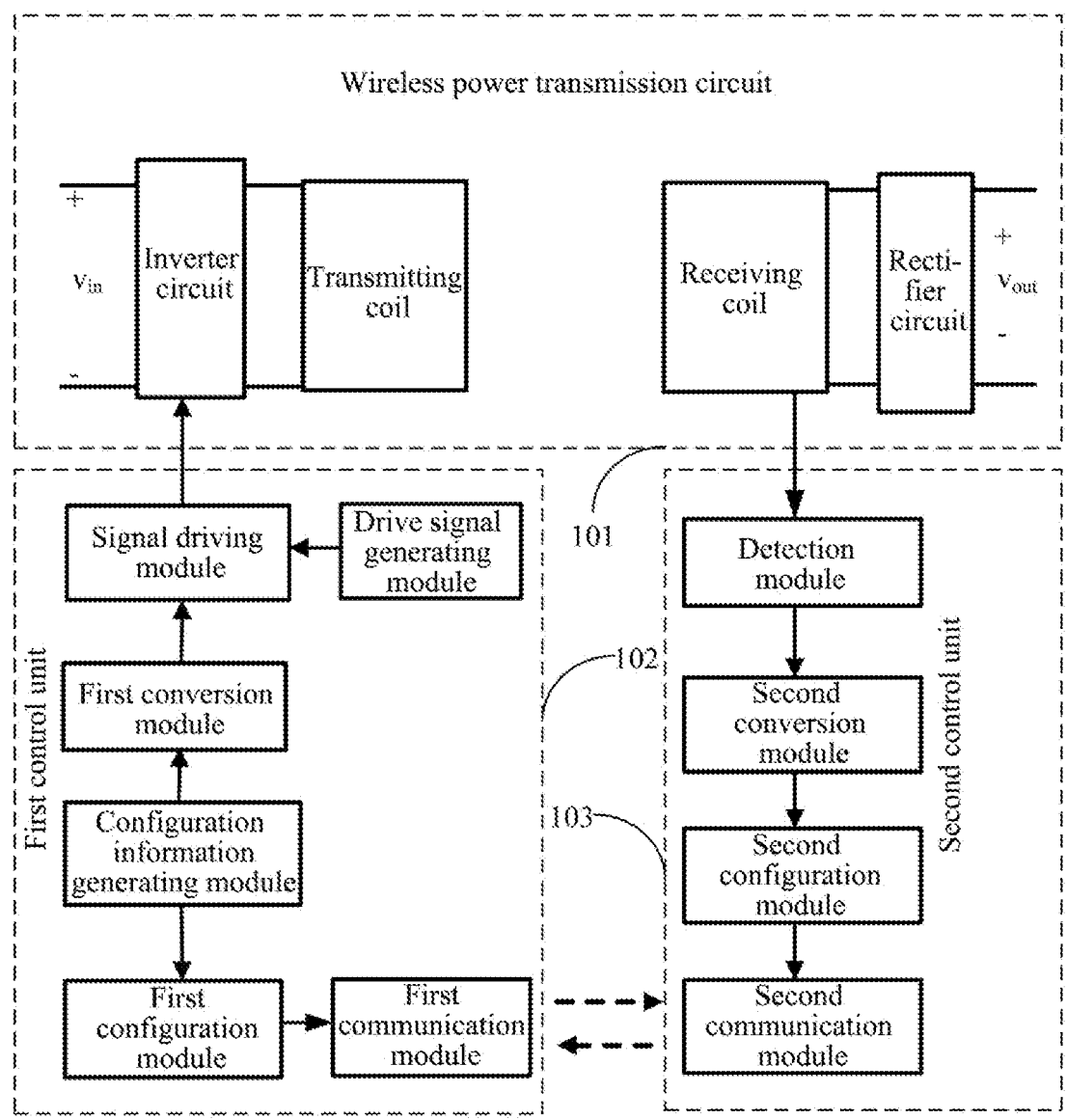
FIG. 2 is a block diagram of another wireless power transmission system according to an embodiment of the present disclosure.

FIG. 2 is a block diagram of another wireless power transmission system 10 according to an embodiment of the present disclosure. As shown in FIG. 2, the first circuit is a transmitting circuit of the wireless power transmission circuit 101, and includes an inverter circuit and a transmitting coil, where the inverter circuit is electrically connected with the transmitting coil. The second circuit is a receiving circuit of the wireless power transmission circuit 101, and includes a receiving coil and a rectifier circuit, where the receiving coil is electrically connected with the rectifier circuit. There is magnetic coupling between the transmitting coil and the receiving coil when the transmitting coil is in close with the receiving coil.

The configuration information generating module is connected with the first configuration module and the first conversion module respectively, the first configuration module is further connected with the first communication module, and the first conversion module is further connected with the driving module. The configuration information generating module generates the block of first preset configuration information, and transmits the block of first preset configuration information to the first configuration module and the first conversion module respectively. The first configuration module configures the first communication module according to the block of first preset configuration information. The first conversion module converts the block of first preset configuration information into the first digital signal via a conversion protocol, and inputs the first digital signal to the driving module to enable the driving module to generate a second driving signal according to the first digital signal and a first driving signal to drive at least one switch of the first circuit.

Exemplarily, the first communication module may be a Bluetooth module, a Wifi module, and a Zigbee module or the like.

In an embodiment, the block of first preset configuration information includes a preset channel identifier, where the preset channel identifier is used to identify a preset channel. The configuration information generating module monitors a communication load of each channel of at least two channels, and selects the channel as the preset channel if no communication load is detected in the channel.

In an embodiment, the conversion protocol is any one of binary conversion, signal duration conversion, or signal duty ratio conversion. When the first conversion module converts the block of first preset configuration information into the first digital signal via the conversion protocol, as an example, the block of first preset configuration information includes a channel identifier, the corresponding binary conversion protocol is: a conversion of the channel identifier (channel) into a binary signal. For instance, channel=N, N is converted into a corresponding binary, if channel=10, then the converted first digital signal is a digital signal of binary 1010. Exemplarily, when the block of first preset configuration information includes a channel identifier, the signal duration conversion is a conversion of the channel identifier into a signal of a corresponding duration, for instance, channel=N, N is converted into a signal having a duration of N*Tunit (unit time), if Tunit=10 ms and channel=10, then the converted first digital signal has a high level or low level of 100 ms. Exemplarily, when the block of first preset configuration information includes a channel identifier, the signal duty ratio conversion protocol is: a conversion of the channel identifier into a signal of a corresponding duty ratio, for instance, channel=N, N is converted into a signal having a duty ratio of N*Dunit (unit duty ratio), for instance, it is assumed that Dunit=3% and channel=10, then the converted first digital signal is a signal having a duty ratio of 30%. Certainly, the embodiment of the present disclosure is described by taking an example where the conversion protocol is any one of binary conversion, signal duration conversion, or signal duty ratio conversion, but this does not mean that the present disclosure is only limited thereto.

Further, the driving module includes a signal driving module and a drive signal generating module. The signal driving module is connected with the drive signal generating module, and the signal driving module is further connected with the first conversion module and the first circuit respectively; in the embodiment of the present disclosure, the drive signal generating module generates a first driving signal, and transmits the first driving signal to the signal driving module; the signal driving module generates a second driving signal according to the received first digital signal and the first driving signal, and inputs the second driving signal to the first circuit so that the first circuit controls at least one switch according to the second driving signal to transmit power to the second circuit.

Exemplarily, the first driving signal generated by the drive signal generating module may have a duty ratio of 50%, and is a pulse signal having a fixed frequency, but not limited thereto, the duty ratio and the frequency may also be determined according to actual conditions.

Exemplarily, the first digital signal may serve as an enable signal of the signal driving module. When the first digital signal is at a high level, the signal driving module is enabled, and the signal driving module transmits the first driving signal to control ON and OFF of a switch of the first circuit; when the first digital signal is at a low level, the signal driving module is disabled, the signal driving module outputs the low level, the switch of the first circuit is off. It should be noted that, the present disclosure is not limited thereto. There may also be a case that the signal driving module is enabled when the first digital signal is at a low level, and the signal driving module is disabled when the first digital signal is at a high level.

The second processing module of the second control unit 103 detects a power signal of the second circuit, obtains a block of second preset configuration information according to the power signal, and then configures the second communication module according to the block of second preset configuration information, where the block of first preset configuration information is correspond to the block of second preset configuration information. As shown in FIG. 2, the second processing module includes a detection module, a second conversion module, and a second configuration module. The second conversion module is connected with the detection module and the second configuration module respectively. The detection module is further connected with the second circuit. The second configuration module is further connected with the second communication module.

The detection module is configured to detect the power signal of the second circuit, generate a second digital signal according to the power signal, and input the second digital signal to the second conversion module.

Optionally, the power signal of the second circuit is an Alternating Current (AC) voltage signal or an AC current signal. The power signal of the second circuit may be a voltage signal of the receiving coil, a voltage signal of the compensation circuit, or a voltage signal of a switch of the rectifier circuit. Alternatively, the power signal of the second circuit may be a current signal flowing through the receiving coil, a current signal in the rectifier circuit, or the like. Certainly, the embodiment of the present disclosure is only used as an example to describe, but it does not mean that the present disclosure is limited thereto.

The second conversion module is configured to obtain the block of second preset configuration information, such as the preset channel identifier, by decoding the second digital signal via a conversion protocol, and input the block of second preset configuration information to the second configuration module. It should be noted that, the conversion protocol used by the second conversion module to obtain the block of second preset configuration information by decoding the second digital signal is a protocol the same as the conversion protocol used by the first conversion module to convert the block of first preset configuration information into the first digital signal, and the process for the second conversion module to obtain the block of second preset configuration information by decoding the second digital signal is a process reciprocal to the process for the first conversion module to convert the block of first preset configuration information into the first digital signal.

The second configuration module is configured to configure the second communication module according to the block of second preset configuration information, e.g., according to the preset channel identifier, thus, the second communication module and the first communication module transmit or receive communication data in the preset channel, and thereby automatic one-to-one communications are realized. With this wireless power transmission system, there is no need to add additional external equipment, the cost is significantly reduced, and the complexity of the system is reduced.

Exemplarily, the second communication module may be a Bluetooth module, a Wifi module, a Zigbee module or the like, and is the same as the first communication module.

Figure 3:
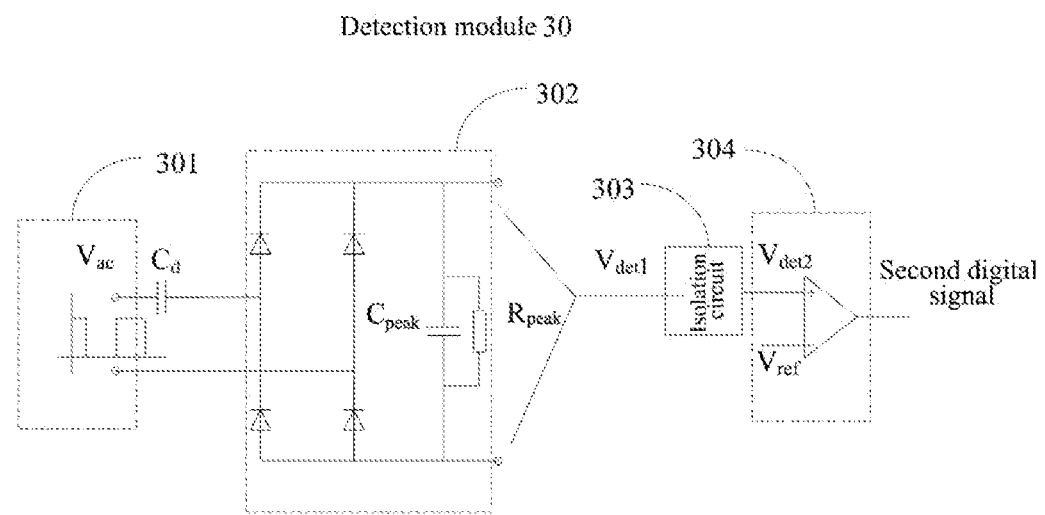
FIG. 3 is a schematic of a detection module according to an embodiment of the present disclosure.

In embodiments of the present disclosure, the detection module may include a detection circuit, a peak voltage holding circuit, an isolation circuit, and a comparison circuit. With reference to FIG. 3 which is a schematic structural diagram of a detection module 30 according to an embodiment of the present disclosure.

The detection circuit 301 is configured to generate a first detection voltage according to the power signal of the second circuit.

The peak voltage holding circuit 302 is electrically connected with the detection circuit 301, which is configured to rectify the detection voltage and hold the peak value of the detection voltage to generate a second detection voltage.

The isolation circuit 303 is electrically connected with the peak voltage holding circuit 302, which is configured to generate a third detection voltage according to the second detection voltage, where the third detection voltage and the second detection voltage are not commonly grounded.

The comparison circuit 304 is electrically connected with the isolation circuit 303, which is configured to output the second digital signal according to the third detection voltage and a reference voltage.

As can be seen with reference to FIG. 3, the detection circuit 301 may be configured to detect an AC power signal of the second circuit to obtain a first detection voltage Vac, a DC blocking capacitor Cd is used to filter the DC component of the first detection voltage Vac, then a rectifier bridge is used to rectify the first detection voltage Vac, and the holding circuit composed of Cpeak and Rpeak obtains a second detection voltage Vdet1 by holding the peak value of the first detection voltage Vac; the second detection voltage Vdet1 passes through the isolation circuit 303 to generate an isolated third detection voltage Vdet2, where the third detection voltage Vdet2 and the second detection voltage Vdet1 are not commonly grounded. The comparator receives the voltage Vdet2 and compares the voltage Vdet2 with a reference value Vref to obtain a second digital signal. The reference Vref is a value greater than 0 and less than the magnitude of the detection voltage Vdet2.

After the detection module 30 outputs the second digital signal, the second conversion module may obtain the block of second preset configuration information by decoding the second digital signal via a conversion protocol, and input the block of second preset configuration information to the second configuration module to enable the second configuration module to configure the second communication module according to the block of second preset configuration information.

Figure 4:
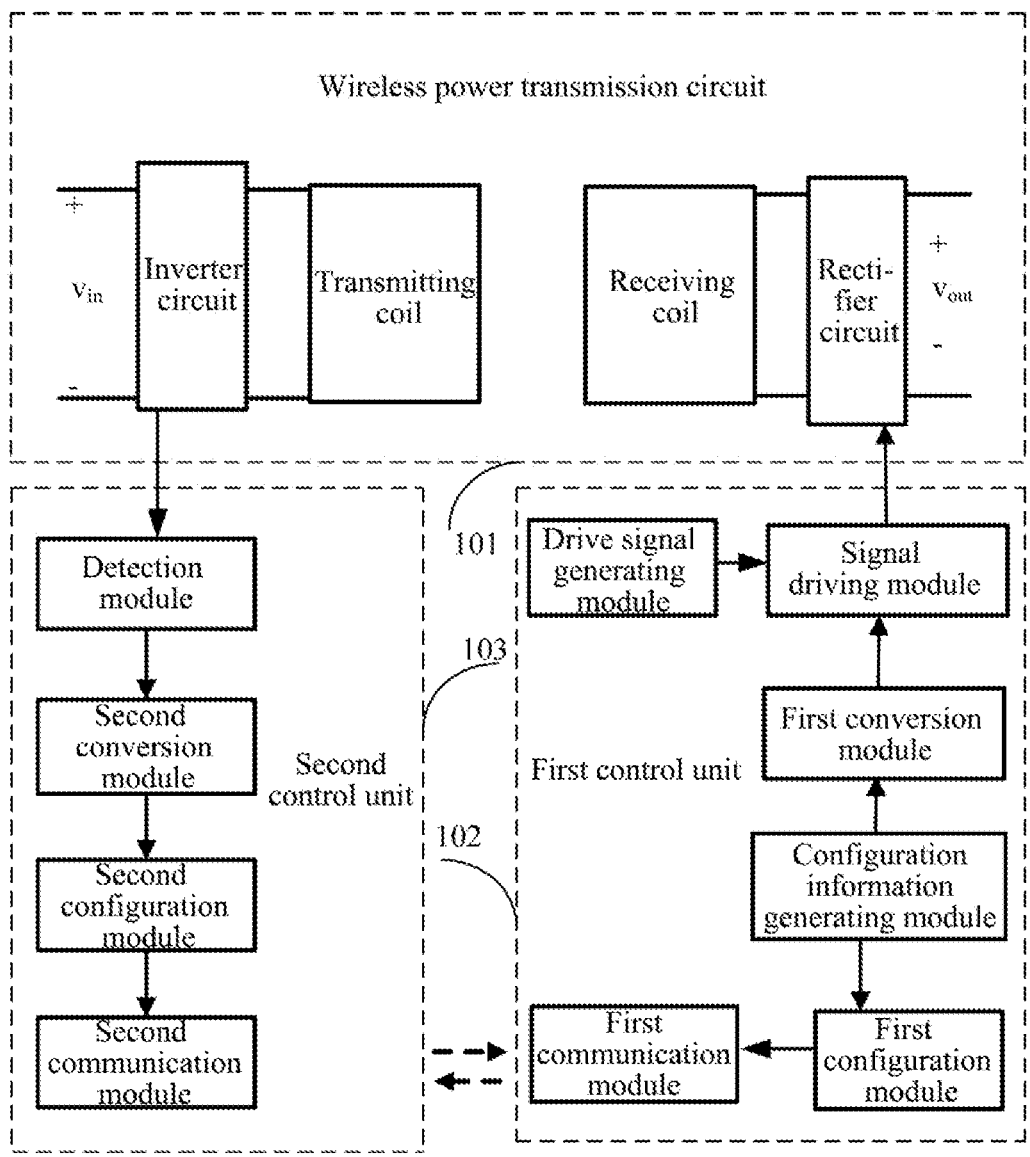
FIG. 4 is a block diagram of yet another wireless power transmission system according to an embodiment of the present disclosure.

The above embodiment is described by taking an example where the first circuit serves as the transmitting circuit and the second circuit serves as the receiving circuit. However, other embodiments are described by taking an example where the first circuit may serve as a receiving circuit and the second circuit may serve as a transmitting circuit. With reference to FIG. 4 which is a schematic structural diagram of yet another wireless power transmission system 10 according to an embodiment of the present disclosure. As shown in FIG. 4, the first circuit is a receiving circuit of the wireless power transmission circuit 101, and includes a receiving coil and a rectifier circuit, and the receiving coil is electrically connected with the rectifier circuit. The second circuit is a transmitting circuit of the wireless power transmission circuit 101, and includes an inverter circuit and a transmitting coil, and the inverter circuit is electrically connected with the transmitting coil. There is magnetic coupling when the transmitting coil is in close with the receiving coil. It should be noted that, in the wireless energy transmission system 10, With reference to descriptions in the embodiments as shown in FIG. 1 and FIG. 2 for implementations of the first control unit 102 and the second control unit 103, and will not be repeated in the embodiment of the present disclosure.

The wireless power transmission system 10 provided in the embodiment of the preset disclosure includes: a wireless power transmission circuit 101, a first control unit 102, and a second control unit 103, where the wireless power transmission circuit 101 includes a first circuit and a second circuit; the second control unit 103 includes a second communication module and a second processing module; the first control unit 102 includes a first communication module, a first processing module and a driving module, where the first processing module is configured to configure the first communication module according to a block of first preset configuration information, and input a first digital signal to the driving module according to the block of first preset configuration information; the driving module is configured to generate a second driving signal according to the first digital signal and a first driving signal, and input the second driving signal to a rectifier circuit of the first circuit; the rectifier circuit of the first circuit controls ON and OFF of its switch according to the second driving signal; in addition, the second processing module detects a power signal of the second circuit, obtains a block of second preset configuration information according to the power signal, and configures the second communication module according to the block of second preset configuration information to make the block of preset configuration information of the second communication module to be corresponding to that of the first communication module, therefore, the one-to-one communications between the transmitting terminal and the receiving terminal are realized according to the blocks of preset configuration information, and complexity of the device is reduced.

To more clearly describe the technical solutions provided in the embodiments of the present disclosure, descriptions are made by taking an example where the first circuit includes an inverter circuit, a compensation capacitor C1 and a transmitting coil Lt, the second circuit includes a receiving coil Lr, a compensation capacitor C2, a center-tapped transformer and a rectifier circuit. The block of first preset configuration information includes a preset channel identifier 2 as an example, with reference to FIG. 5 which is a schematic of yet another wireless power transmission system 10 according to an embodiment of the present disclosure. In the wireless power transmission system 10, the configuration information generating module generates a block of first preset configuration information including the preset channel identifier 2, and transmits a preset channel identifier 2 to the first configuration module and the first conversion module. The first configuration module configures the first communication module according to the block of first preset configuration information, and sets a channel information of the first communication module to 2 by setting a corresponding register. Exemplarily, the first communication module performs communications by means of Wifi, and after the first configuration module completes the configuration, the first communication module transmits or receives communication data on a channel 2 corresponding to the channel information 2.

Correspondingly, after receiving the block of first preset configuration information, the first conversion module generates a first digital signal according to a conversion protocol. Descriptions are made by taking an example where the conversion protocol is a binary conversion protocol, the first conversion module converts, according to the binary conversion protocol, the preset channel identifier 2 included in the block of first preset configuration information to obtain the first digital signal, and transmits the first digital signal to a signal driving module. Exemplarily, the channel identifier is 4-bit binary, and the time corresponding to each bit is 10 milliseconds. After the preset channel identifier 2 is subject to the binary conversion, a binary code 0010 is obtained. In an embodiment, in order to enable the receiver side to implement a correct detection, a start bit may be added. The start bit, which consists of a time length of 5 ms 1 and a time length of 5 ms 0, is added to the front of the binary code, when the receiver side detects the start bit, the subsequent data is the valid information to make the information received correctly.

The driving module includes a drive signal generating module and a signal driving module, where the drive signal generating module generates a first driving signal. The signal driving module generates a second driving signal according to the first digital signal and the first driving signal to correspondingly control ON and OFF of switches M1, M2, M3 and M4 of the inverter circuit. In an embodiment, with reference to FIG. 6 which shows waveforms for the schematic of FIG. 5. As shown in FIG. 6, the first digital signal may serve as an enable signal of the signal driving module. When the first digital signal is at a high level (e.g., 1), the second driving signal is the first driving signal, which is used to drive ON and OFF of the switches M1-M4 of the inverter circuit; when the first digital signal is at a low level (e.g., 0), the second driving signal is at a low level, and the switches M1-M4 are off. Optionally, the first driving signal has a frequency of 300 kHz and a duty ratio of 50%.

Figure 5:
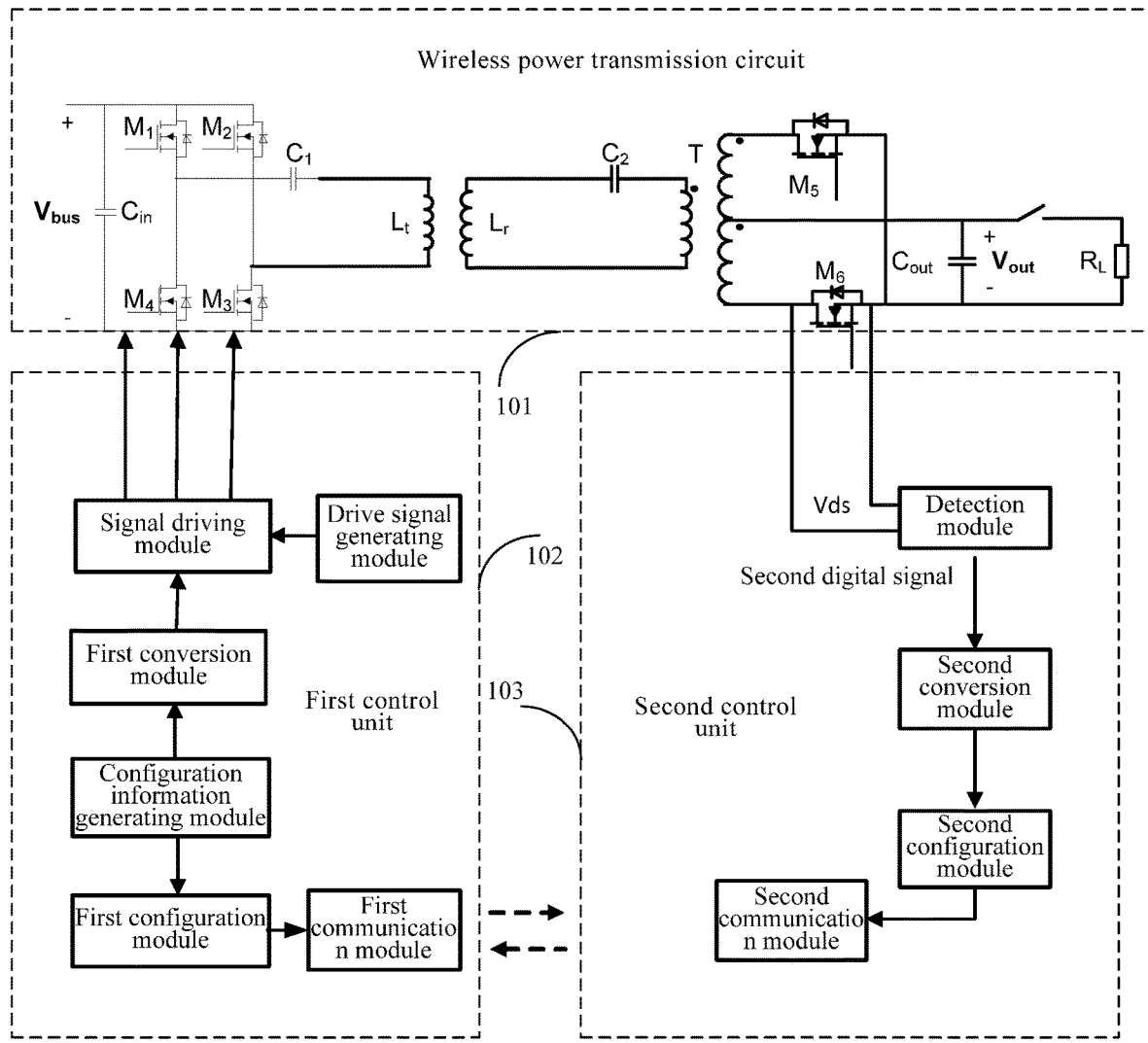
FIG. 5 is a schematic of yet another wireless power transmission system according to an embodiment of the present disclosure.
Figure 6:
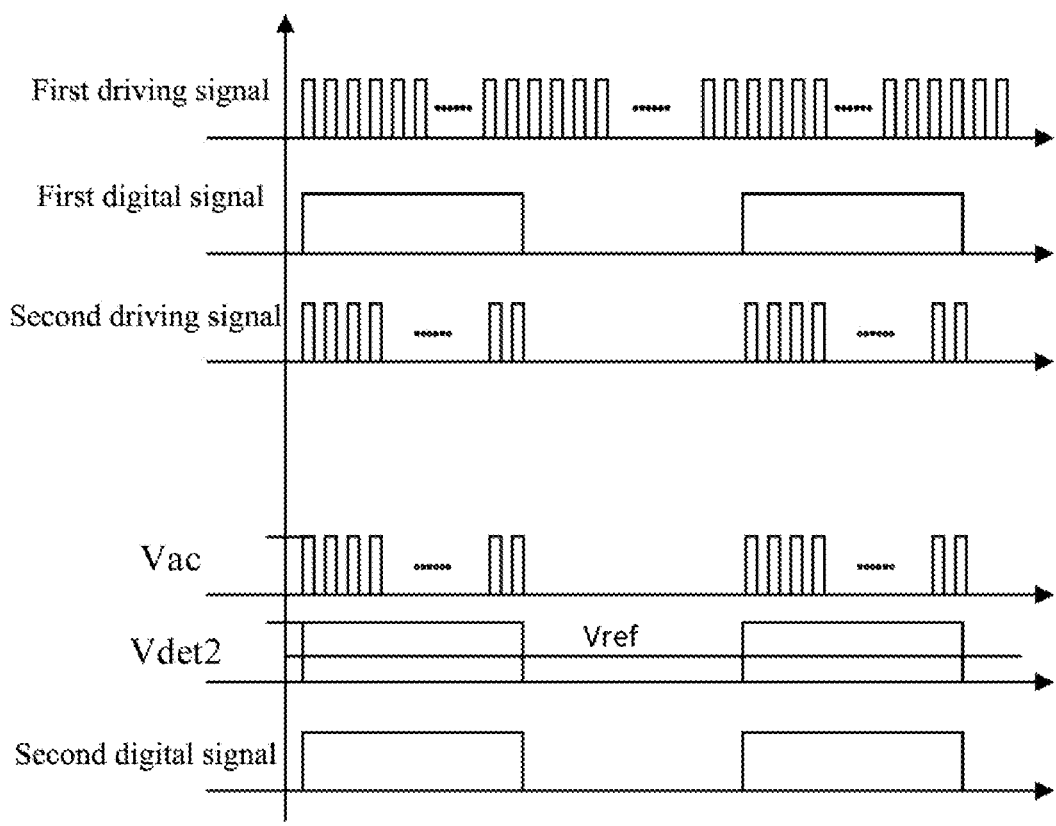
FIG. 6 shows waveforms for the schematic of FIG. 5.

As shown in FIG. 5 and FIG. 6, the detection module of the second control unit 103 detects the voltage Vds at both ends of the switch M6 of the rectifier circuit as the detection voltage Vac. As shown in FIG. 6, when the driving of the inverter is enabled, Vds is a square wave with a frequency of 300 kHz, a duty ratio of 50% and 0/2Vout. The square wave signal passes through a DC blocking capacitor Cd, a rectifier circuit, a peak holding circuit and a comparator to get a high level; when the driving of the inverter circuit is disabled, the voltage Vds of the switch M6 of the rectifier circuit is a direct current voltage, which passes through the DC blocking capacitor Cd, the rectifier circuit, the peak holding circuit, and the comparator to get a low level, and thus a second digital signal is obtained. Therefore, as shown in FIG. 6, both the second digital signal and the first digital signal are data corresponding to the binary code 0010. In this embodiment, the block of second preset configuration information, such as the preset channel identifier 2, is decoded by the second conversion module according to the second digital signal and the conversion protocol used by the first conversion module. The second configuration module configures the second communication module according to the preset channel identifier 2 outputted by the second conversion module to set the channel information of the second communication module to 2. Exemplarily, the second communication module performs communications by means of Wifi, and transmits and receives communication data on the channel 2 corresponding to the channel information 2 after the second configuration module completes the configuration. Therefore, the communication channel of the second communication module is the same as that of the first communication module, therefore, the one-to-one communications between the transmitter side and the receiver side may be realized, and complexity of the device is reduced.

It should be noted that, when the block of first preset configuration information is generated by the configuration information generating module, in the foregoing embodiment, descriptions are only made by taking an example where the block of first preset configuration information includes the preset channel identifier, but in practical applications, a plurality of wireless power transmission systems 10 may operate simultaneously in the wireless power supply system, the number of wireless power transmission circuits 101 will be restricted due to the limited number of channels. To solve this problem, in another embodiment, an identifier number is added to the block of first preset configuration information and the communicated data, and the identifier number (ID) is used to distinguish identifiers of contents of the communication data to determine whether the communication data is needed by itself. In this way, the plurality of wireless power transmission systems 10 may be operated on the same channel simultaneously and the communication data may be distinguished.

In another embodiment, the block of first preset configuration information may include a preset channel identifier and a preset identifier number. The preset channel identifier is used to identify the preset channel, and the preset identifier number is included in the communicated data. The first communication module and the second communication module read the preset identifier number and compare it with their own preset identifier numbers to realize a simultaneous operation of a plurality of wireless power transmission systems 10 working on the same channel and distinguish the communication data, if the preset identifier number is the same as their own preset identifier numbers, then it is determined that the communication data is an acceptable communication data.

Exemplarily, the configuration information generating module may determine the block of first preset configuration information using the following three methods:

method 1: the configuration information generating module may fix a channel of at least two channels, set the fixed channel as a preset channel; or, randomly select a channel of at least two channels, and set the randomly selected channel as a preset channel; and set an identifier number of the wireless power transmission circuit 101 as the preset identifier number, and the preset identifier number is unique.

In method 1, when the block of first preset configuration information includes a preset channel identifier and a preset identifier number, it is necessary to determine the preset channel identifier and the preset identifier number respectively. When determining the preset channel identifier, a preset channel may be fixed, or a preset channel may be randomly selected, and an identifier of the preset channel is the preset channel identifier.

When determining the preset identifier number, since the identifier number of the wireless power transmission circuit 101 is unique, that is, a transmitter side and a receiver side of the same wireless power transmission circuit 101 are corresponding to the same serial number, an identifier number of the wireless power transmission circuit 101 may be determined as the preset identifier number.

Method 2: determine a communication load of each channel of at least two channels according to the number of monitored identifier numbers, and select a channel with fewer communication load as the preset channel; and set an identifier number of the wireless power transmission circuit 101 as the preset identifier number, and the preset identifier number is unique.

In method 2, when determining the preset channel identifier, since the communication data includes identifier numbers of respective receiver sides/transmitter sides, the configuration information generating module monitors load status of each channel according to the number of monitored identifier numbers, and selects a channel with fewer communication loads as the preset channel, and thus an identifier of the preset channel is determined as the preset channel identifier.

Similarly, when determining the preset identifier number, since the identifier number of the wireless power transmission circuit 101 is unique, the identifier number of the wireless power transmission circuit 101 may be determined as the preset identifier number, and thus the block of first preset configuration information is determined.

It should be noted that, in the embodiments of the present disclosure, in the above two methods, the identifier number of the wireless power transmission circuit 101 may be a serial number of the wireless power transmission circuit 101, or an identifier number specifically set for establishment of communications.

Method 3: generate M*N blocks of configuration information according to channel identifiers and identifier numbers; where M represents the number of the channel identifiers, and N represents the number of the identifier numbers.

step A: select a block of first configuration information from the M*N blocks of configuration information, where the block of first configuration information is a block of configuration information corresponding to H and L, H is a channel identifier of the block of first configuration information, and L is an identifier number of the block of first configuration information.

step B: the first configuration module configures the first communication module according to the block of first configuration information, where the first communication module transmits a block of first data information on the channel H, and the block of first data information includes the identifier number L, a first serial number, and a first flag bit of the block of first configuration information.

The first communication module receives multiple blocks of second data information within a preset time period on the channel H, and each block of second data information includes a second identifier number, a second serial number, and a second flag bit, or each block of second data information includes a second identifier number, a second flag bit, and valid communication data.

The first communication module obtains a block of second configuration information according to a block of second data information, where a channel identifier of the block of second configuration information is the channel identifier H of the block of first configuration information, and an identifier number of the block of second configuration information is the second identifier number.

The first flag bit is used to identify the occupancy of the block of first configuration information, and the second flag bit is used to identify the occupancy of the block of second configuration information.

step C: compare the block of first data information with the block of second data information, if the second identifier number is the same as the identifier number of the block of first configuration information, and each of the second flag bits identifies that the block of second configuration information is not occupied, that is, the block of first configuration information is the same as the block of second configuration information and is not occupied, then compare the first serial number with the second serial number, if meeting the comparison principle, then select the block of first configuration information as the block of first preset configuration information, set H as the preset channel identifier, and set L as the preset identifier number.

Exemplarily, the comparison principle may be that the wireless power transmission system with the smallest serial number occupies the block of preset configuration information. or the comparison principle may be that the wireless power transmission system with the maximum serial number occupies the block of preset configuration information In addition, in step C, if the second identifier number is the same as the identifier number of the block of first configuration information, and at least one of the second flag bits identifies that the block of second configuration information has been occupied, that is, the block of first configuration information is the same as the block of second configuration information and has been occupied; then reselect a new block of first configuration information from the M*N blocks of configuration information, and repeat step B and step C.

Alternatively, in step C, if the second identifier number is different from the identifier number of the block of first configuration information, that is, the block of first configuration information is different from the block of second configuration information, then select the block of first configuration information as the block of first preset configuration information.

Exemplarily, in Method 3, whether the channel and the identifier number are occupied may be determined by the level of the flag bit, when the identifier is at a high level, it is determined that the channel and the identifier number are occupied; or when the identifier is at a low level, it is determined that the channel and the identifier number are occupied.

Figure 7:
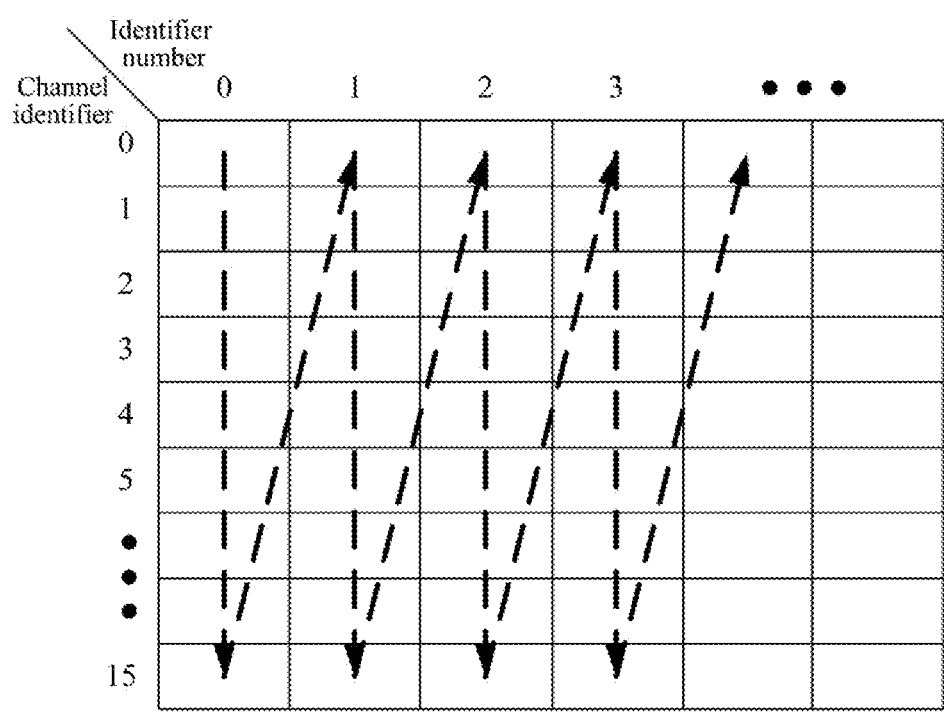
FIG. 7 shows a rule for selecting a block of first configuration information according to an embodiment of the present disclosure.

It should be noted that, when a new block of first configuration information is reselected, FIG. 7 which shows a rule for selecting a block of first configuration information according to an embodiment of the present disclosure can be referred. As can be seen with reference to FIG. 7, when selecting the block of first configuration information, the channels may be sequentially traversed and then the identifier numbers may be traversed; exemplarily, if there are 15 channels and at least 3 identifier numbers, a block of configuration information corresponding to the $0^{th}$ channel and the $0^{th}$ identifier number may be selected first; if the $0^{th}$ channel and the $0^{th}$ identifier number do not meet the above conditions, a block of configuration information corresponding to the $1^{st}$ channel and the $0^{th}$ identifier number is then reselected as the block of first configuration information; if the $1^{st}$ channel and the $0^{th}$ identifier number do not meet the above conditions, a block of configuration information corresponding to the $2^{nd}$ channel and the $0^{th}$ identifier number is then reselected as the block of first configuration information, and so on; when the $15^{th}$ channel and the $0^{th}$ identifier number do not meet the above conditions, a block of configuration information corresponding to the $0^{th}$ channel and the $1^{st}$ identifier number is then reselected as the block of first configuration information; if the $0^{th}$ channel and the $1^{st}$ identifier number do not meet the above conditions, a block of configuration information corresponding to the $1^{st}$ channel and the $1^{st}$ identifier number is then reselected as the block of first configuration information, and so on, to determine the block of first configuration information.

Figure 8:
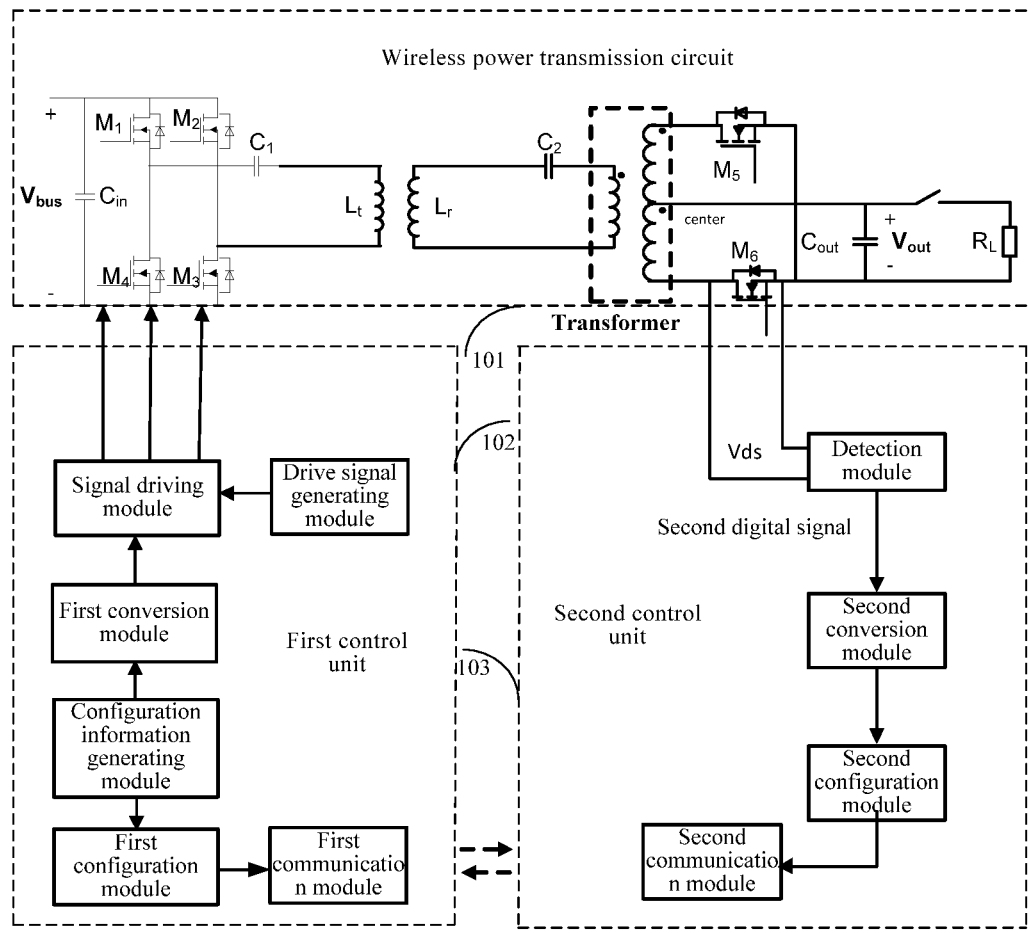
FIG. 8 is a schematic of yet another wireless power transmission system according to an embodiment of the present disclosure.

FIG. 8 is a schematic of yet another wireless power transmission system 10 according to an embodiment of the present disclosure. In the wireless power transmission system 10, the configuration information generating module generates a block of first preset configuration information including the preset channel identifier 2 and the preset identifier number 3, and transmits a preset channel identifier 2 and a preset identifier number 3 to the first configuration module and the first conversion module; the first configuration module configures the first communication module according to the block of first preset configuration information, sets a channel information of the first communication module to 2 through a corresponding register, and sets a preset identifier number 3 in the data that needs to be communicated, and meanwhile sets occupied flag bit of a channel 2 at a high level (assuming that the high level means being occupied). Exemplarily, the first communication module performs communications by means of Wifi, and after the first configuration module completes the configuration, the communication data is transmitted on the channel 2 corresponding to the channel information 2, and meanwhile the data may also be received on the channel 2.

Correspondingly, after receiving the block of first preset configuration information, the first conversion module generates a first digital signal according to a conversion protocol. Descriptions are made by taking an example where the conversion protocol is a binary conversion protocol, the first conversion module converts, according to the binary conversion protocol, the preset channel identifier 2 and the preset identifier number 3 included in the block of first preset configuration information to obtain a first digital signal 1, and transmits the first digital signal 1 to a driving module. Exemplarily, the channel identifier is 4-bit binary, the identifier number is 8-bit binary; and the corresponding channel identifier is upper-bit binary, the corresponding identifier number is lower-bit binary, the time of each bit is 10 milliseconds. After the preset channel identifier 2 and the preset identifier number 3 are subject to the binary conversion, binary codes 0010 00000011 are obtained. In an embodiment, in order to enable the receiver side to implement a correct detection, a start bit may be added. The start bit, which consists of a time length of 5 ms 1 and a time length of 5 ms 0, is added to the front of the binary code, when the receiver side detects the start bit, the subsequent data is the valid information to make the information received correctly.

The driving module includes a drive signal generating module and a signal driving module, where the drive signal generating module generates a first driving signal 1. The signal driving module generates a second driving signal 2 according to the first digital signal 1 and the first driving signal 1 to correspondingly control ON and OFF of switches M1, M2, M3 and M4 of the inverter circuit. In an embodiment, the first digital signal 1 may serve as an enable signal of the signal driving module. When the first digital signal 1 is at a high level (e.g., 1), the second driving signal 2 is the first driving signal 1, which is used to drive ON and OFF of the switches M1-M4 of the inverter circuit; when the first digital signal 1 is at a low level (e.g., 0), the second driving signal 2 is at a low level, and the switches M1-M4 are off. Optionally, the first driving signal has a frequency of 300 kHz and a duty ratio of 50%.

Correspondingly, the detection module of the second control unit 103 detects the voltage of the switch M6 of the rectifier circuit, when the driving of the inverter circuit at the transmitter side is enabled, the voltage of the switch M6 at the receiver side is: a square wave with a frequency of 300 kHz, a duty ratio of 50% and 0/2Vout. The square wave signal passes through a DC blocking capacitor Cd, a rectifier circuit, a peak holding circuit and a comparator to get a high level; when the driving of the inverter circuit at the transmitter side is disabled, the voltage of the switch M6 at the receiver side is a direct current voltage, which passes through the DC blocking capacitor Cd, the rectifier circuit, the peak holding circuit, and the comparator to get a low level, and thus a second digital signal 2 is obtained, that is, data corresponding to the binary code 0010 00000011. The second digital signal is input to the second conversion module, and the block of second preset configuration information, such as the preset channel identifier 2 and the preset identifier number 3, is decoded by the second conversion module according to the second digital signal 2 and the conversion protocol used by the first conversion module, and the preset channel identifier 2 and the preset identifier number 3 are input to the second configuration module to enable the second configuration module to configure the second communication module according to the preset channel identifier 2 and the preset identifier number 3 outputted by the second conversion module so as to set the channel information of the second communication module to 2, the preset identifier number to 3, and the occupied flag bit of the channel 2 at a high level. Exemplarily, the second communication module performs communications by means of Wifi, and transmits communication data on the channel 2 corresponding to the channel information 2 after the second configuration module completes the configuration. The communication data may include valid control data and preset identifier numbers, such as the occupied flag bits of the block of the preset identifier number 3 and the channel 2, so that the block of preset configuration information of the second communication module is the same as that of the first communication module, therefore, the one-to-one communications between the transmitter side and the receiver side may be realized according to the blocks of preset configuration information, and complexity of the device is reduced.

In addition, when the second communication module or the first communication module needs to receive control data, since the control data includes a preset identifier number, the second communication module or the first communication module may compare its own identifier number with the received preset identifier number. If they are corresponding to each other or the same, then it is determined that the control data is what it needs, and a plurality of wireless power transmission systems 10 operate on the same channel simultaneously.

Figure 9:
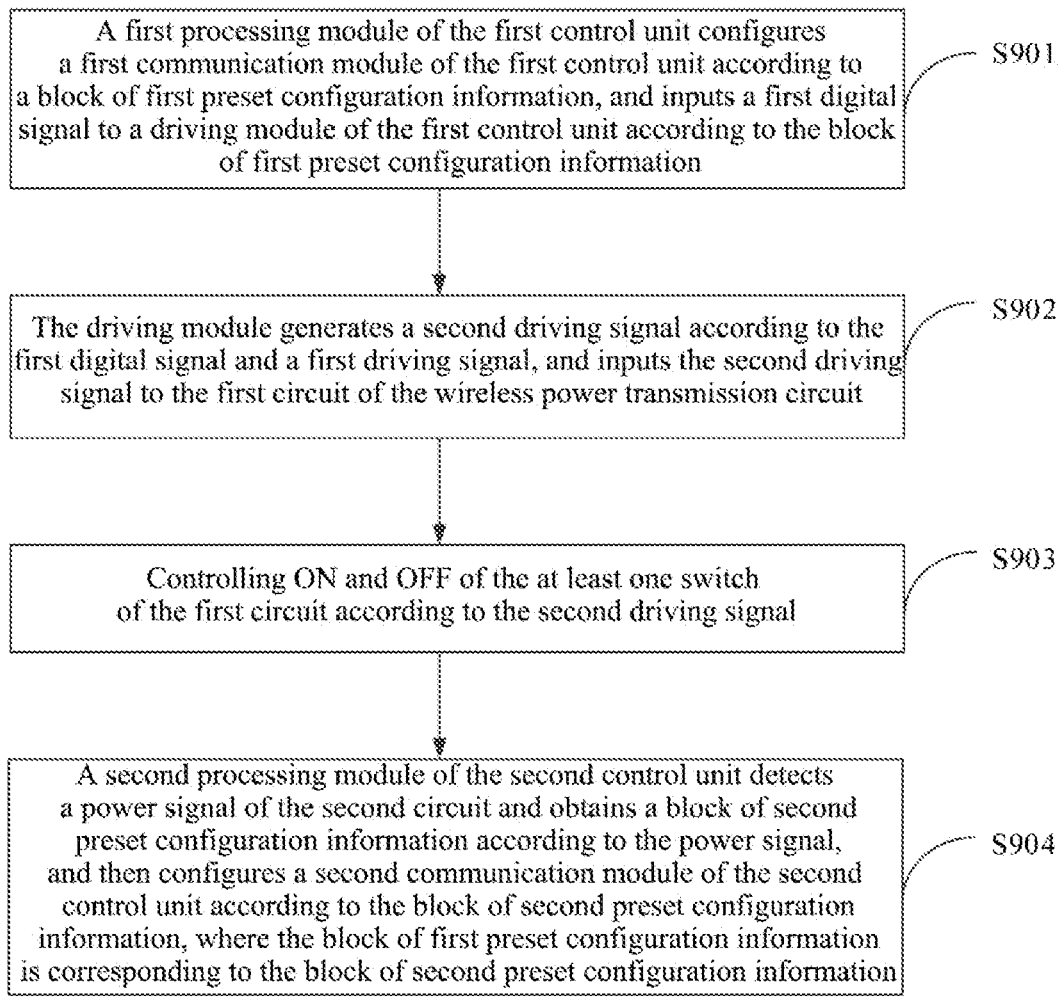
FIG. 9 is a flowchart of a data transmission method according to an embodiment of the present disclosure.

FIG. 9 is a flowchart of a data transmission method applied in the wireless power transmission system as shown in FIG. 1 to FIG. 8 according to an embodiment of the present disclosure. The wireless power transmission system includes a wireless power transmission circuit, a first control unit, and a second control unit, the wireless power transmission circuit includes a first circuit and a second circuit, where the first circuit includes at least one switch. With reference to FIG. 9, and the data transmission method may include:

S901, a first processing module of the first control unit configures a first communication module of the first control unit according to a block of first preset configuration information, and inputs a first digital signal to a driving module of the first control unit according to the block of first preset configuration information.

S902, the driving module generates a second driving signal according to the first digital signal and a first driving signal, and inputs the second driving signal to the first circuit of the wireless power transmission circuit.

S903, controlling ON and OFF of the at least one switch of the first circuit according to the second driving signal.

S904, a second processing module of the second control unit detects a power signal of the second circuit and obtains a block of second preset configuration information according to the power signal, and then configures a second communication module of the second control unit according to the block of second preset configuration information, where the block of first preset configuration information is corresponding to the block of second preset configuration information.

Optionally, the first circuit includes an inverter circuit and a transmitting coil, and the second circuit includes a receiving coil and a rectifier circuit.

The inverter circuit is connected with the transmitting coil, the inverter circuit is further connected with the driving module; the receiving coil is connected with the rectifier circuit, and the rectifier circuit is further connected with the second processing module.

Optionally, the first circuit includes a receiving coil and a rectifier circuit, and the second circuit includes an inverter circuit and a transmitting coil.

The receiving coil is connected with the rectifier circuit, the rectifier circuit is connected with the driving module; the inverter circuit is connected with the transmitting coil, and the inverter circuit is further connected with the second processing module.

Optionally, the second processing module of the second control unit detecting the power signal of the second circuit may include:

the second processing module of the second control unit detecting an AC voltage signal or an AC current signal of the second circuit.

Optionally, the first processing module of the first control unit configuring the first communication module of the first control unit according to the block of first preset configuration information and inputting the first digital signal to the driving module of the first control unit according to the block of first preset configuration information may include:

The configuration information generating module of the first processing module generates the block of first preset configuration information, and transmits the block of first preset configuration information to the first configuration module of the first processing module and the first conversion module of the first processing module respectively.

The first configuration module configures the first communication module according to the block of first preset configuration information.

The first conversion module converts the block of first preset configuration information into the first digital signal via a conversion protocol, and inputs the first digital signal to the driving module; the conversion protocol is any one of a binary conversion, a signal duration conversion, or a signal duty ratio conversion.

Optionally, the second processing module of the second control unit detecting the power signal received by the second circuit, obtaining the block of second preset configuration information according to the power signal, and then configuring the second communication module of the second control unit according to the block of second preset configuration information may include:

the detection module of the second processing module detecting the power signal of the second circuit, generating a second digital signal according to the power signal, and then inputting the second digital signal to the second conversion module of the second processing module.

The second conversion module obtains the block of second preset configuration information by decoding the second digital signal via the conversion protocol, and inputs the block of second preset configuration information to the second configuration module of the second processing module.

The second configuration module configures the second communication module according to the block of second preset configuration information.

Optionally, the block of first preset configuration information includes a preset channel identifier, and the configuration information generating module of the first processing module generating the block of first preset configuration information includes:

the configuration information generating module monitors a communication load of each channel of at least two channels, and selects the channel as a preset channel if there is no communication load in the channel; where the preset channel identifier is used to identify the preset channel.

Optionally, the block of first preset configuration information includes a preset channel identifier and a preset identifier number; where a first preset channel identifier is used to identify the preset channel, and the first communication module and the second communication module select received data according to the preset identifier number.

Optionally, the configuration information generating module fixes a channel of at least two channels, sets the fixed channel as a preset channel; or, randomly selects a channel of at least two channels, and sets the randomly selected channel as a preset channel; and set an identifier number of the wireless power transmission circuit as the preset identifier number, and the preset identifier number is unique.

Optionally, the configuration information generating module of the first processing module generating the block of first preset configuration information may include:

the configuration information generating module determining a communication load of each channel of at least two channels according to the number of monitored identifier numbers, and selecting a channel with fewer communication load as the preset channel; and setting, and uniquely setting an identifier number of the wireless power transmission circuit as the preset identifier number.

Optionally, the configuration information generating module of the first processing module generating the block of first preset configuration information may include:

the configuration information generating module generating M*N blocks of configuration information according to channel identifiers and identifier numbers; where M represents the number of the channel identifiers, and N represents the number of the identifier numbers.

step A: selecting a block of first configuration information from the M*N blocks of configuration information, where the block of first configuration information is a block of configuration information corresponding to H and L, H is a channel identifier of the block of first configuration information, and L is an identifier number of the block of first configuration information.

step B: the first configuration module configuring the first communication module according to the block of first configuration information, where the first communication module transmits a block of first data information on the channel H, and the block of first data information includes the identifier number, a first serial number, and a first flag bit.

The first communication module receiving multiple blocks of second data information within a preset time period on the channel H, and each block of second data information includes a second identifier number, a second serial number, and a second flag bit, or each block of second data information includes a second identifier number, a second flag bit, and valid communication data.

The first communication module obtaining a block of second configuration information according to a block of second data information, where a channel identifier of the block of second configuration information is the channel identifier H of the block of first configuration information, and an identifier number of the block of second configuration information is the second identifier number.

The first flag bit is used to identify the occupancy of the block of first configuration information, and the second flag bit is used to identify the occupancy of the block of second configuration information.

step C: the configuration information generating module comparing the block of first data information with the block of second data information, if the second identifier number is the same as the identifier number of the block of first configuration information, and each of the second flag bits identifies that the block of second configuration information is not occupied, then comparing the first serial number with the second serial number, if meeting the comparison principle, then selecting the block of first configuration information as the block of first preset configuration information, setting H as the preset channel identifier, and setting L as the preset identifier number.

Optionally, the data transmission method may also include:

in step C, if the second identifier number is the same as the identifier number of the block of first configuration information, and the second flag bit identifies that the block of second data information has been occupied, that is, the block of first configuration information is the same as the block of second configuration information and has been occupied, then the configuration information generating module reselecting a new block of first configuration information from the M*N blocks of configuration information, and repeating step B and step C.

Optionally, the data transmission method may also include:

in step C, if the second identifier number is different from the identifier number of the block of first configuration information, that is, the block of first configuration information is different from the block of second configuration information, then the configuration information generating module selects the block of first configuration information as the block of first preset configuration information.

Optionally, the driving module generates the second driving signal according to the first digital signal and the first driving signal, and inputs the second driving signal to the first circuit of the wireless power transmission circuit may include:

the drive signal generating module of the driving module generates the first driving signal and transmits the first driving signal to the signal driving module of the driving module.

The signal driving module generates a second driving signal according to the first digital signal and the first driving signal, and inputs the second driving signal to the first circuit.

Optionally, the detection module of the second processing module detects the power signal of the second circuit, and generates the second digital signal according to the power signal may include:

the detection circuit of the detection module generates a first detection voltage according to the power signal of the second circuit.

The peak voltage holding circuit of the detection module is electrically connected with the detection circuit, and rectifies the first detection voltage and holds the peak value of the first detection voltage to generate a second detection voltage.

The isolation circuit of the detection module is electrically connected with the peak voltage holding circuit and generates a third detection voltage according to the second detection voltage, where the third detection voltage and the second detection voltage are not commonly grounded.

The comparison circuit of the detection module is electrically connected with the isolation circuit and outputs the second digital signal according to the third detection voltage and a reference voltage.

The data transmission method described in the embodiments of the present disclosure may implement technical solutions of the wireless power transmission system described in any one of the above embodiments. Its implementation principle and beneficial effects are similar, and will not be repeated herein.

Those skilled in the art will readily recognize other embodiments of the present disclosure upon consideration of the specification and practice of the disclosure disclosed herein. The present disclosure is intended to cover any variations, usages, or adaptive changes of the present disclosure. These variations, usages or adaptive changes follow general principles of the present disclosure, and include common knowledge or common technical means that are not disclosed in the present disclosure. The specification and embodiments are to be considered exemplary only, with the true scope and spirit of the present disclosure being indicated by the appended claims.

It will be appreciated that the present disclosure is not limited to the precise structure that has been described above and shown in the drawings, and various modifications and changes can be made without departing from the scope of the present disclosure. The scope of the present disclosure is limited only by the appended claims.

What is claimed is:

1. A wireless power transmission system, comprising:
a wireless power transmission circuit comprising a first circuit and a second circuit, wherein the first circuit comprises at least one switch;
a first control unit comprising a first communication module, a first processing module, and a driving module, wherein:
the first processing module is configured to: configure the first communication module according to a block of first preset configuration information, output a first digital signal according to the block of first preset configuration information;
the driving module is configured to generate a second driving signal according to the first digital signal and a first driving signal; and
the at least one switch of the first circuit is controlled according to the second driving signal, and power is transmitted from the first circuit to the second circuit; and
a second control unit comprising a second communication module and a second processing module, wherein the second processing module is configured to: detect a power signal of the second circuit, obtain a block of second preset configuration information according to the power signal, and configure the second communication module according to the block of second preset configuration information, wherein the block of first preset configuration information is corresponding to the block of second preset configuration information to realize a one-to-one communication.

2. The wireless power transmission system according to claim 1, wherein
the first circuit comprises an inverter circuit and a transmitting coil, and the second circuit comprises a receiving coil and a rectifier circuit;
the inverter circuit is connected with the transmitting coil and the driving module respectively; the rectifier circuit is connected with the receiving coil and the second processing module respectively.

3. The wireless power transmission system according to claim 1, wherein
the first circuit comprises a receiving coil and a rectifier circuit, and the second circuit comprises an inverter circuit and a transmitting coil;
the inverter circuit is connected with the transmitting coil and the second processing module respectively; the rectifier circuit is connected with the receiving coil and the driving module respectively.

4. The wireless power transmission system according to claim 1, wherein the power signal of the second circuit is an Alternating Current (AC) voltage signal or an AC current signal.

5. The wireless power transmission system according to claim 1, wherein the first processing module comprises a configuration information generating module, a first configuration module, and a first conversion module;
the configuration information generating module is connected with the first configuration module and the first conversion module respectively, the first configuration module is further connected with the first communication module, and the first conversion module is further connected with the driving module;
the configuration information generating module is configured to generate the block of first preset configuration information, and transmit the block of first preset configuration information to the first configuration module and the first conversion module respectively;
the first configuration module is configured to configure the first communication module according to the block of first preset configuration information; and
the first conversion module is configured to convert the block of first preset configuration information into the first digital signal via a conversion protocol.

6. The wireless power transmission system according to claim 1, wherein the second processing module comprises a detection module, a second conversion module, and a second configuration module;
the second conversion module is connected with the detection module and the second configuration module respectively, the detection module is further connected with the second circuit, and the second configuration module is further connected with the second communication module;
the detection module is configured to: detect the power signal of the second circuit, generate a second digital signal according to the power signal;
the second conversion module is configured to obtain the block of second preset configuration information by decoding the second digital signal via a conversion protocol; and
the second configuration module is configured to configure the second communication module according to the block of second preset configuration information.

7. The wireless power transmission system according to claim 5, wherein the block of first preset configuration information comprises a preset channel identifier used to identify the preset channel;
the configuration information generating module is further configured to:
monitor a communication load of each channel of at least two channels, and select the channel as a preset channel if there is no communication load in the channel.

8. The wireless power transmission system according to claim 5, wherein the block of first preset configuration information comprises a preset channel identifier and a preset identifier number,
the preset channel identifier is used to identify the preset channel, and the first communication module and the second communication module identify communicated data according to the preset identifier number.

9. The wireless power transmission system according to claim 8, wherein the configuration information generating module is further configured to:
fix a channel of at least two channels, set the fixed channel as a preset channel; or, randomly select a channel of the at least two channels, and set the randomly selected channel as a preset channel; and
set an identifier number of the wireless power transmission circuit as the preset identifier number, and the preset identifier number is unique for each wireless power transmission.

10. The wireless power transmission system according to claim 8, wherein the configuration information generating module is further configured to:
determine a communication load of each channel of at least two channels according to the number of monitored identifier numbers, and select a channel with fewer communication load as the preset channel; and
set an identifier number of the wireless power transmission circuit as the preset identifier number, and the preset identifier number is unique for each wireless power transmission.

11. The wireless power transmission system according to claim 8, wherein the configuration information generating module is further configured to:
  generate M*N blocks of configuration information according to channel identifiers and identifier numbers; wherein M represents the number of the channel identifiers, and N represents the number of the identifier numbers;
  step A: select a block of first configuration information from the M*N blocks of configuration information, wherein the block of first configuration information is a block of configuration information corresponding to H and L, H is a channel identifier of the block of first configuration information, and L is an identifier number of the block of first configuration information;
  step B: configure, by the first configuration module, the first communication module according to the block of first configuration information, the first communication module transmits a block of first data information on the channel H, and the block of first data information comprises the identifier number L, a first serial number, and a first flag bit of the block of first configuration information;
  the first communication module receives multiple blocks of second data information within a preset time period on the channel H, and each block of second data information comprises a second identifier number, a second serial number, and a second flag bit, or each block of second data information comprises a second identifier number, a second flag bit, and valid communication data;
  the first communication module obtains a block of second configuration information according to a block of second data information, wherein a channel identifier of the block of second configuration information is the channel identifier H of the block of first configuration information, and an identifier number of the block of second configuration information is the second identifier number;
  wherein the first flag bit is used to identify the occupancy of the block of first configuration information, and the second flag bit is used to identify the occupancy of the block of second configuration information;
  step C: compare the block of first data information with the block of second data information, if the second identifier number is the same as the identifier number of the block of first configuration information, and each of the second flag bits identifies that the block of second configuration information is not occupied,
  then compare the first serial number with the second serial number, if meeting the comparison principle, then select the block of first configuration information as the block of first preset configuration information, set H as the preset channel identifier, and set L as the preset identifier number.

12. The wireless power transmission system according to claim 11, wherein the configuration information generating module is further configured to:
  in step C, if the second identifier number is the same as the identifier number of the block of first configuration information, and at least one of the second flag bits identifies that the block of second configuration information has been occupied,
  then reselect a new block of first configuration information from the M*N blocks of configuration information, and repeat step B and step C.

13. The wireless power transmission system according to claim 11, wherein the configuration information generating module is further configured to:
  in step C, if the second identifier number is different from the identifier number of the block of first configuration information, then select the block of first configuration information as the block of first preset configuration information.

14. The wireless power transmission system according to claim 5, wherein the driving module comprises a signal driving module and a drive signal generating module;
  the signal driving module is connected with the drive signal generating module, and the signal driving module is further connected with the first conversion module and the first circuit respectively;
  the drive signal generating module is configured to generate the first driving signal; and
  the signal driving module is configured to generate the second driving signal according to the first digital signal and the first driving signal.

15. The wireless power transmission system according to claim 6, wherein the detection module comprises a detection circuit, a peak voltage holding circuit, an isolation circuit, and a comparison circuit;
  the detection circuit is configured to generate a first detection voltage according to the power signal of the second circuit;
  the peak voltage holding circuit is electrically connected with the detection circuit, which is configured to rectify the first detection voltage and hold the peak of the first detection voltage to generate a second detection voltage;
  the isolation circuit is electrically connected with the peak voltage holding circuit, which is configured to generate a third detection voltage according to the second detection voltage, wherein the third detection voltage and the second detection voltage are not commonly grounded; and
  the comparison circuit is electrically connected with the isolation circuit, which is configured to output the second digital signal according to the third detection voltage and a reference voltage.

16. A data transmission method applied in a wireless power transmission system, wherein the wireless power transmission system comprises a wireless power transmission circuit, a first control unit and a second control unit, the wireless power transmission circuit comprises a first circuit and a second circuit, wherein the first circuit comprises at least one switch, and the data transmission method comprises:
  configuring a first communication module of the first control unit according to a block of first preset configuration information;
  outputting a first digital signal according to the block of first preset configuration information;
  generating a second driving signal according to the first digital signal and a first driving signal, and controlling the at least one switch of the first circuit according to the second driving signal to transmit power from the first circuit to the second circuit;
  detecting a power signal of the second circuit and obtaining a block of second preset configuration information according to the power signal; and
  configuring a second communication module of the second control unit according to the block of second preset configuration information, wherein the block of second preset configuration information is corresponding to the block of first preset configuration information to realize a one-to-one communication.

17. The data transmission method according to claim 16, wherein the detecting the power signal of the second circuit comprises:
   detecting an Alternating Current (AC) voltage signal or an AC current signal of the second circuit.

18. The data transmission method according to claim 16, wherein the outputting the first digital signal according to the block of first preset configuration information comprises:
   converting the block of first preset configuration information into the first digital signal via a conversion protocol.

19. The data transmission method according to claim 16, wherein the detecting the power signal of the second circuit and the obtaining the block of second preset configuration information according to the power signal comprise:
   detecting the power signal of the second circuit and generating a second digital signal according to the power signal; and
   obtaining the block of second preset configuration information by decoding the second digital signal via a conversion protocol.

20. The data transmission method according to claim 16, wherein the block of first preset configuration information comprises a preset channel identifier used to identify the preset channel, the method further comprises:
   monitoring a communication load of each channel of at least two channels, and selecting the channel as a preset channel if there is no communication load in the channel.

21. The data transmission method according to claim 16, wherein the block of first preset configuration information comprises a preset channel identifier and a preset identifier number;
   the preset channel identifier is used to identify the preset channel, and the first communication module and the second communication module identify communicated data according to the preset identifier number.

22. The data transmission method according to claim 21, wherein:
   fixing a channel of at least two channels, setting the fixed channel as a preset channel; or, randomly selecting a channel of at least two channels, and setting the randomly selected channel as a preset channel; and
   uniquely setting an identifier number of the wireless power transmission circuit as the preset identifier number.

23. The data transmission method according to claim 21, wherein:
   determining a communication load of each channel of at least two channels according to the number of monitored identifier numbers, and selecting a channel with fewer communication load as the preset channel; and
   uniquely setting an identifier number of the wireless power transmission circuit as the preset identifier number.

24. The data transmission method according to claim 21, wherein:
   generating M*N blocks of configuration information according to channel identifiers and identifier numbers; wherein M represents the number of the channel identifiers, and N represents the number of the identifier numbers;
   step A: selecting a block of first configuration information from the M*N blocks of configuration information, wherein the block of first configuration information is a block of configuration information corresponding to H and L, H is a channel identifier of the block of first configuration information, and L is an identifier number of the block of first configuration information;
   step B: configuring the first communication module according to the block of first configuration information, the first communication module transmits a block of first data information on the channel H, and the block of first data information comprises the identifier number L, a first serial number, and a first flag bit of the block of first configuration information;
   the first communication module receives multiple blocks of second data information within a preset time period on the channel H, and each block of second data information comprises a second identifier number, a second serial number, and a second flag bit, or each block of second data information comprises a second identifier number, a second flag bit, and valid communication data;
   the first communication module obtains a block of second configuration information according to a block of second data information, wherein a channel identifier of the block of second configuration information is the channel identifier H of the block of first configuration information, and an identifier number of the block of second configuration information is the second identifier number;
   the first flag bit is used to identify the occupancy of the block of first configuration information, and the second flag bit is used to identify the occupancy of the block of second configuration information;
   step C: comparing the block of first data information with the block of second data information, if the second identifier number is the same as the identifier number of the block of first configuration information, and each of the second flag bits identifies that the block of second configuration information is not occupied, then comparing the first serial number with the second serial number, if meeting the comparison principle, then selecting the block of first configuration information as the block of first preset configuration information, setting H as the preset channel identifier, and setting L as the preset identifier number.

25. The data transmission method according to claim 24, further comprising:
   in step C, if the second identifier number is the same as the identifier number of the block of first configuration information, and at least one of the second flag bits identifies that the block of second configuration information has been occupied,
   then reselecting a new block of first configuration information from the M*N blocks of configuration information, and repeating step B and step C.

26. The data transmission method according to claim 24, further comprising:
   in step C, if the second identifier number is different from the identifier number of the block of first configuration information, then selecting the block of first configuration information as the block of first preset configuration information.

* * * * *